United States Patent [19]

Hirakawa et al.

[11] Patent Number: 4,846,778
[45] Date of Patent: Jul. 11, 1989

[54] SLITTER SCORER INCLUDING A HEAD EXCHANGING DEVICE

[75] Inventors: Tadashi Hirakawa; Yukuharu Seki; Yukio Oku, all of Hiroshima, Japan

[73] Assignee: Mitsubishi Jukogyo Kabushiki Kaisha, Tokyo, Japan

[21] Appl. No.: 116,281

[22] PCT Filed: Feb. 17, 1987

[86] PCT No.: PCT/JP87/00101
§ 371 Date: Oct. 26, 1987
§ 102(e) Date: Oct. 26, 1987

[87] PCT Pub. No.: WO87/04970
PCT Pub. Date: Aug. 27, 1987

[30] Foreign Application Priority Data
Feb. 17, 1986 [JP] Japan .................. 61-32427

[51] Int. Cl.⁴ .............................................. B26D 1/56
[52] U.S. Cl. ........................... 493/354; 493/355; 493/367; 83/302; 83/495; 83/885
[58] Field of Search ............. 493/354, 355, 365, 367, 493/369, 370, 475; 83/302, 481, 495, 496, 498, 864, 885

[56] References Cited

U.S. PATENT DOCUMENTS

| 3,882,765 | 5/1975 | Tokuno | 493/369 X |
| 4,010,677 | 3/1977 | Hirakawa et al. | 93/58.2 R |
| 4,033,217 | 7/1977 | Flaum et al. | 83/425.4 |

FOREIGN PATENT DOCUMENTS 52-109682 9/1977 Japan .
57-50667 10/1982 Japan .
58-51000 11/1983 Japan .

Primary Examiner—Eugene R. LaRoche
Assistant Examiner—Robert J. Pascal
Attorney, Agent, or Firm—Bernard, Rothwell & Brown

[57] ABSTRACT

A slitter scorer including a pair of rotating shafts and roll heads fixedly mounted opposite to each other on said rotating shafts, thereby working a sheet carried between said roll heads, comprises plurality of pairs of head holding shafts having the same diameter as that of said pair of rotating shafts and capable of being disposed on an extension of an end of said pair of rotating shafts concentrically to said pair of rotating shafts, head exchanging means for exchanging said plurality of pairs of head holding shafts, roll heads held to said head holding shafts and means for moving said roll heads axially, whereby said roll heads on the rotating shafts and said roll heads on said head holding shafts are exchanged by slidably moving said rotating shafts and said head holding shafts.

5 Claims, 4 Drawing Sheets

SLITTER SCORER INCLUDING A HEAD EXCHANGING DEVICE

TECHNICAL FIELD

The present invention relates to a slitter scorer such as a corrugating machine which cuts a sheet of corrugated cardboard traveling continuously or scores the cardboard with depressed lines in the traveling direction thereof, and more particularly to such an apparatus including heads (rolls for forming depressed lines) which can be exchanged automatically.

PRIOR ART

A slitter scorer such as a corrugating machine which cuts a sheet of currugated cardboard traveling continuously or scores the cardboard with depressed lines in the traveling direction thereof is structured as shown in FIGS. 6 to 8, for example.

In FIGS. 6 to 8, heads $H_1$ and $H_2$ include rolls which score the sheet with depressed lines and are generally composed of at least a pair of rolls $H_1$ and $H_2$ having opposite outer uneven peripheries. The number of necessary rolls to be assembled in the heads is determined by the number of depressed lines. The upper and lower heads opposite to each other are set on predetermined positions of head rotating shafts $S_1$ and $S_2$ corresponding to positions on the sheet in which the depressed lines are formed.

The head rotating shafts $S_1$ and $S_2$ are both supported by an operation side frame 01 and a drive side frame 02 and are driven by a power unit disposed outside of the drive side frame 02.

Each time special depressed lines are required, a set of upper and lower heads is exchanged with another set of rolls having different uneven form.

Each of the rolls is formed in a unit structure as shown in FIGS. 7 and 8 and assembled by bolts 03 into the head when the head is exchanged. Accordingly, the operation of the machine is stopped to change the setting of the heads.

In the conventional apparatus described above, when the special depressed lines are necessary, exchange of heads having another form requires disassembling and assembling of each of the heads (rolls). Accordingly, it takes a long time to exchange the heads. Further, the exchange of the heads necessarily requires stoppage of the machine and accordingly the production efficiency is extremely reduced particularly in the case of a small lot of production.

DISCLOSURE OF THE INVENTION

The slitter scorer according to the present invention does not use conventional heads (rolls) which are divided to be disassembled and assembled and shifts heads on head rotating shafts onto head holding shafts of a head exchanging device to automatically exchange the shifted heads with other heads mounted on other head holding shafts as a cartridge collectively.

The heads composed of upper and lower rolls are structured into a cassette. The cassette is moved in a perpendicular direction to movement of a sheet of corrugated cardboard to be assembled into a machine and the cassette is removed from the machine to be exchanged with another cassette.

This head exchange operation can be made without stoppage of the machine.

BEST MODE FOR IMPLEMENTING THE INVENTION

In FIGS. 1 to 5, X represents a head exchanging device portion, Y represents a slitter scorer portion, SA and SB represent head rotating shafts, HA and HB represent roll heads for depressed lines, Ha and Hb represent roll heads for exchange, 1a and 2a represent head holding shafts, 1b and 2b represent head holding shafts, 3a and 3b represent rotary frames, 4 represents a pusher, 6 and 7 represent pushes, 8 represents a motor, 9 represents a gear (small), 10 represents a gear (large), 11 represents a motor, 12 represents a sprocket, 13 represents a chain, 14 represents a sprocket, 15 represents a screw shaft, 16 represents a case (head exchanging device portion), 17 represents a cap (head exchanging device portion), 21 represents a carrier, 22, 23 and 24 represents pushers, 25 represents an operation side frame, 26 represents a drive side frame, 27 represents an air cylinder, 28 represents an arm, 31 represents a bearing (bracket type), 32 represents a bearing, and 33 represents a bearing sleeve.

Figure 1:
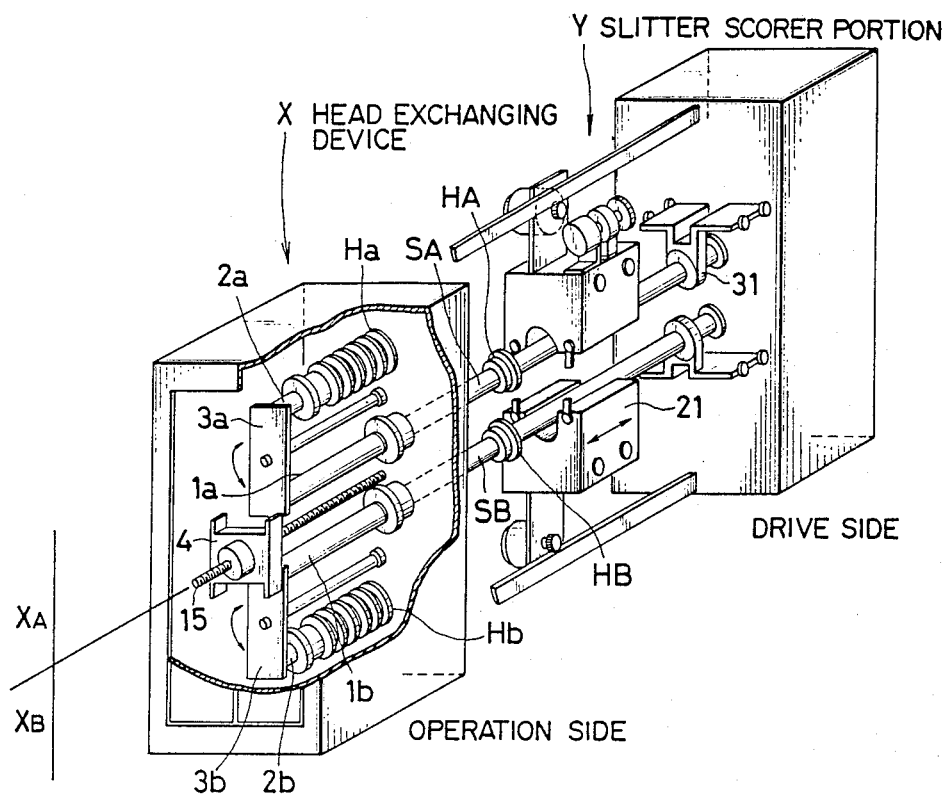
FIG. 1 is a perspective view of a slitter scorer including a head exchanging device according to the present invention.

In FIG. 1, the head exchanging device portion X is disposed outside of an outer end of the operation side of the head rotating shafts SA and SB in the slitter scorer portion Y. The head holding shaft 1a of the head exchanging device portion X is disposed concentrically to the shaft SA of the slitter scorer portion Y and has the same diameter as that of the shaft SA. Similarly, the head holding shaft 1b of the head exchanging device portion X corresponds to the shaft SB of the slitter scorer portion Y. When the head is to be exchanged, the roll head HA fitted onto the shaft SA and the roll head HB fitted onto the shaft SB of the slitter scorer portion Y are carried in the axial direction by the respective carriers 21 and received to the head holding shafts 1a and 1b of the head exchanging device portion X, respectively. When the roll heads HA and HB are completely received to the shafts 1a and 1b, respectively, the rotary frames 3a and 3b are rotated by 180° so that the shafts 2a and 2b are set concentrically to the shafts SA and SB, respectively. The cartridges of the roll heads Ha and Hb for exchange which have been set on the shafts 2a and 2b, respectively, are sent to the head rotating shafts SA and SB, respectively, of the slitter scorer portion Y by the pusher 4 collectively.

The head exchanging device portion X are composed of the upper and lower groups having the same structure as described above. Accordingly, only the upper group $X_A$ are described in more detail.

Figure 4:
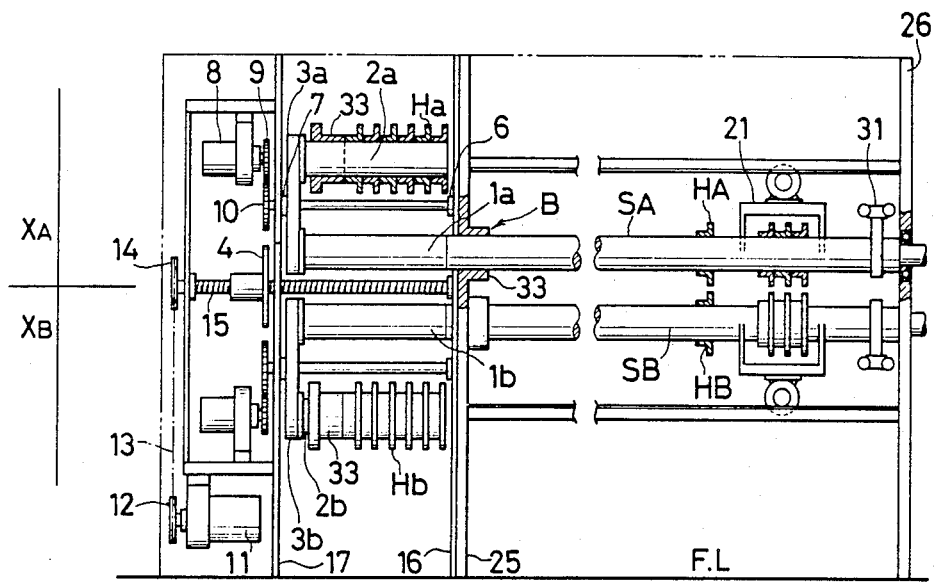
FIG. 4 is a front view of FIG. 1.
Figure 5:
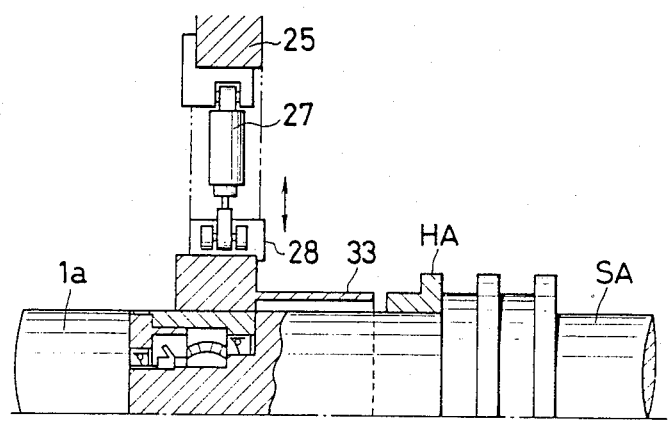
FIG. 5 shows in detail a part of B of FIG. 4.
Figure 6:
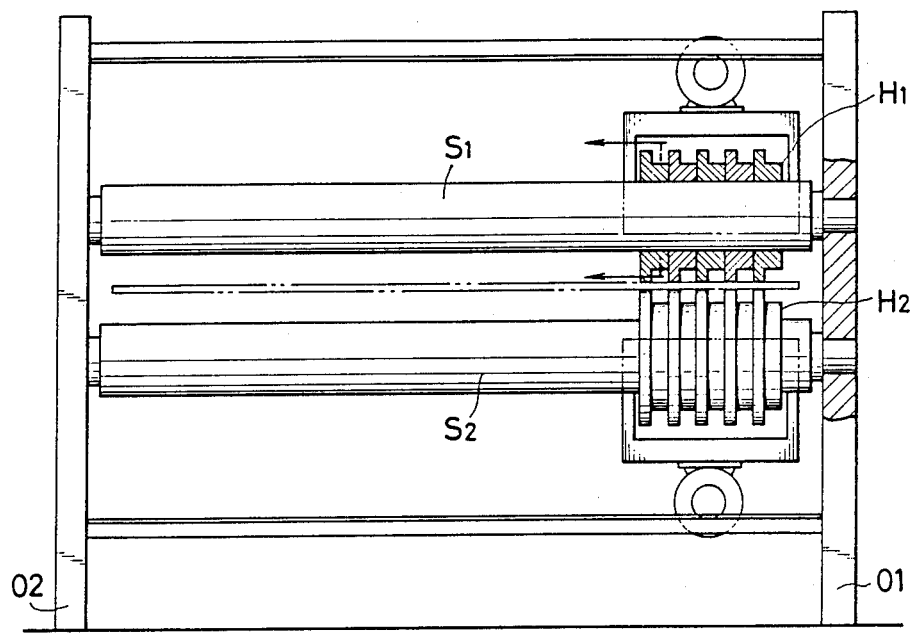
FIG. 6 illustrates a conventional head exchanging system.
Figure 7:
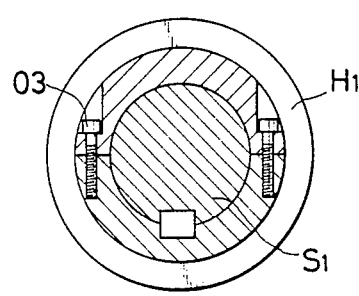
FIG. 7 is a sectional view taken along line D—D of FIG. 6.
Figure 8:
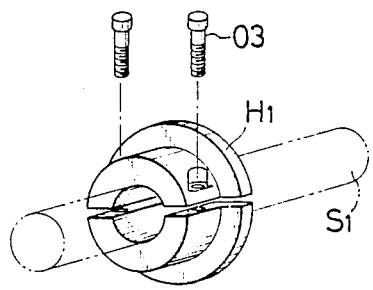
FIG. 8 is a perspective view of a roll head.

As shown in FIGS. 4 and 5, the upper group $X_A$ of the head exchanging device X comprises the two head holding shafts 1a and 2a onto which the head HA and Ha are fitted, respectively, the rotary frame 3a to which the shafts 1a and 2a are cantilever mounted, a drive unit of the rotary frame 3a and the carriers 4 and 21 of the rolls. The upper group of the head exchanging device is driven and controlled by a controller not shown.

One of the two shafts 1a and 2a is used to receive the head HA set in the slitter scorer portion Y upon exchange, and the other is used to mount the heads Ha for exchange as the cartridges. A rotating shaft is mounted to the center of the rotary frame 3a and the rotating shaft is held through the pushes 6 and 7 to the case 16 and the cap 17 of the head exchanging device X. When the rotating shaft is rotated by 180°, the shafts 1a and 2a are replaced with each other.

Figure 2:
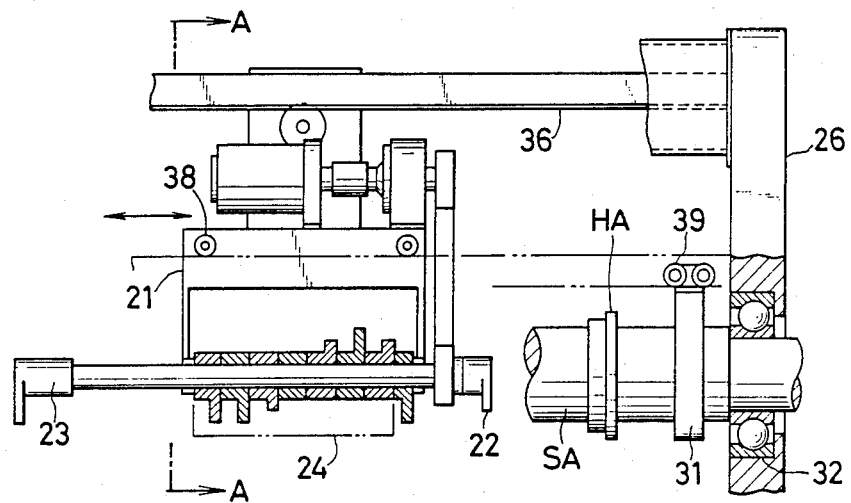
FIG. 2 is a front view of a carrier portion of FIG. 1.
Figure 3:
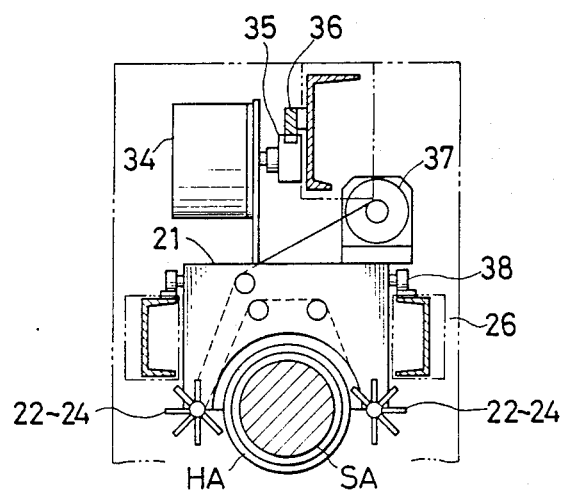
FIG. 3 is a sectional view taken along line A-A of FIG. 2.

The roll head HA is set to a predetermined concentrical position while holding the head rotating shaft SA as shown in FIGS. 2 and 3, and the exchange of the head is made by the following operation.

The pusher 22 of the carrier 21 is used to carry the bearing 31 provided near the drive side frame 26 to a predetermined central position of the shaft SA. When the positioning of the bearing 31 is finished, a nail of the pusher 22 is rotated so that the engagement of the nail and the bearing is removed.

The air cylinder is then shortened to move the arm 28 fixing the bearing sleeve 33 to cause the bearing sleeve 33 to be movable.

The shaft SA is supported by two points of the bearings 31 and 32 which is fixed to the drive side frame 26.

The roll head HA is carried to the operation side by the carrier 21 and received to the shaft 1a together with the bearing sleeve 33 by the pusher 23. When the roll head HA has been carried completely and it is confirmed that the carrier 21 is returned to the predetermined position, the frame 3a is rotated by 180° by the motor 8 through the gears 9 and 10. After the shaft 2a mounting the head Ha for exchange has faced the head rotating shaft SA, the head Ha for exchange is carried to the drive side together with the bearing sleeve 33 by the pusher 4 driven through the sprocket 12, the chain 13, the sprocket 14 and the screw shaft 15 by the motor 11 and is received by the head drive shaft SA.

After the pusher 4 has carried the head Ha and the bearing sleeve 33 to the predetermined position, the pusher 4 is reset to the original position and the bearing sleeve 33 is fixed to the predetermined position of the operation side frame 25 by the oil hydraulic cylinder 27 through the arm 28.

The bearing 31 is set to the predetermined position near the drive side frame 26 and the heads are set to the predetermined position of the shaft SA by the pusher 24 of the carrier 21 so that the heads are opposite to each other in the vertical direction, thereby completing the exchange of the heads.

Since the heads function as the pair of upper and lower heads HA and HB, most of the head exchanging device portion X is composed of the upper and lower groups.

In the embodiment, the upper and lower groups are exchanged as a set. The positioning device of the heads uses the device shown in Japanese Patent Application No. 61-15080. The structure thereof is schematically illustrated in FIGS. 2 and 3. In FIGS. 2 and 3, numeral 34 represents a motor for moving the carrier 21, numeral 35 represents a pinion mounted to a motor 34 and meshed with a rack 36, numeral 37 represents a selection motor of the pushers 22 to 24, numeral 38 represents a roller for moving the carrier 21, and numeral 39 represents a roller for moving the bearing 31.

The head exchanging device according to the present invention comprises the roll heads for exchange which form depressed special lines and are previously mounted on standby as the cartridges, whereby the roll heads set in the machine can be removed axially and replaced with the heads for exchange being on standby collectively when the depressed lines are to be changed to the special lines. Accordingly, the replacement of the roll heads can be easily made in a short time without stop of the operation of the machine and the productivity is improved greatly.

We claim:

1. A slitter scorer including a pair of rotating shafts and roll heads fixedly mounted opposite to each other on said rotating shafts, thereby working a sheet carried between said roll heads, comprising:

a plurality of pairs of head holding shafts having the same diameter as that of said pair of rotating shafts and capable of being disposed on an extension of an end of said pair of rotating shafts concentrically to said pair of rotating shafts; head exchanging means for exchanging said plurality of pairs of head holding shafts; roll heads held to said head holding shafts; and means for moving said roll heads axially, whereby said roll heads on the rotating shafts and said roll heads on said head holding shafts are exchanged by slidably moving said rotating shafts and said head holding shafts.

2. A slitter scorer according to claim 1, wherein said plurality of head holding shafts includes one end fixed a common frame and said frame can be moved to position the other end of one of said head holding shafts on an extension of an end of said rotating shafts.

3. A slitter scorer according to claim 2, wherein said frame can be rotated about one point.

4. A slitter scorer according to claim 3, wherein said rotating shaft includes a small diameter portion disposed at said head exchanging means side and said small diameter portion is supported by a bearing portion including a bearing having the same outer diameter as that of said rotating shaft and a bearing sleeve which receives said bearing and is mounted to said frame detachably, said rotating shafts capable of being supported by a bearing which can be slidably moved axially.

5. A slitter scorer according to claim 4, wherein said moving means is mounted to a carrier for positioning said roll heads.

* * * * *